B. D. MORRELL.
Shock-Binder.
No. 201,275. Patented March 12, 1878.
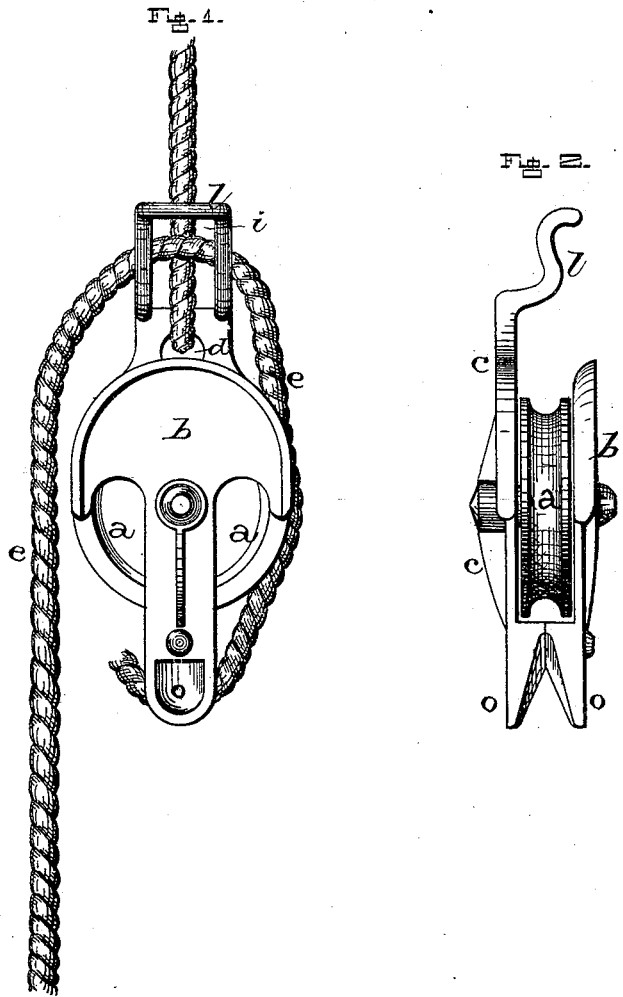
WITNESSES.
J. W. Garner
Will. H. Kern
INVENTOR.
B. D. Morrell,
per
F. A. Lehmann,
Atty.

UNITED STATES PATENT OFFICE.

BENJAMIN D. MORRELL, OF SHARPSBURG, PENNSYLVANIA.

IMPROVEMENT IN SHOCK-BINDERS.

Specification forming part of Letters Patent No. 201,275, dated March 12, 1878; application filed February 13, 1878.

*To all whom it may concern:*

Be it known that I, BENJAMIN D. MORRELL, of Sharpsburg, in the county of Allegheny and State of Pennsylvania, have invented certain new and useful Improvements in Corn and Fodder Shock Binders; and I do hereby declare the following to be a full, clear, and exact description of the invention, such as will enable others skilled in the art to which it pertains to make and use it, reference being had to the accompanying drawings, which form part of this specification.

My invention relates to an improved corn and fodder shock binder; and it consists in the peculiar construction that will be more fully described hereinafter, whereby the shock can be tightly compressed, so as to enable the operator to bind it with much greater ease and in less time than can be done in the usual way.

The accompanying drawings represent my invention.

$a$ represents an ordinary grooved pulley, of any suitable size, which is journaled in the frame $b$. This frame is made of two parts, which are riveted securely together below the lower edge of the pulley, leaving ample room for the pulley to revolve freely between them. The rear side $c$ of this frame extends upward a suitable distance above the upper edge of the pulley, and has a hole, $d$, made through it for the passage of the compressing-rope $e$. Just above this hole $d$ the end of the frame is bent, as shown, so as to extend toward or over the top of the pulley, and has a large opening, $i$, made through it. This upper bent end $l$ serves as a guide for the rope, and is so formed as not in any way to chafe or injure the rope during the operation of compressing the shock.

Upon the lower end of the frame is formed, by the two projecting ends O, a V-shaped groove between them, in the center of which groove is a flange, rib, or any other device which will catch hold of the rope without injuring it. This end is thus formed that, after the rope has been passed around the pulley, the greater the strain upon the rope the more securely it will be held.

The operation of my device is as follows: The rope $e$ has a knot tied in one end, and the other end is passed from behind through the hole $d$, and thence up through the opening $i$ in the side $c$. The operator, holding the long end of the rope in one hand, swings the binder around the shock, and, when it has encircled it, seizes it with the other hand, and, after placing the rope on the pulley, draws it tight, so as to compress the shock as much as possible. The rope, when the shock has been sufficiently compressed, is drawn through the V-shaped opening in the lower end of the frame, then upward, and forced in between the extended end of the side $c$ and the knotted end of the rope, which, being tight, forces the former partly into the hole $i$. The rope, thus held, cannot yield or slip, and so holds the shock tightly compressed, ready to be bound by the operator.

Having thus described my invention, I claim—

The frame $b$, having the two holes $d$ $i$ in its upper end, and a V-shaped frictional holding device in its lower end, in combination with the pulley $a$ and rope $e$, substantially as set forth.

In testimony that I claim the foregoing I have hereunto set my hand this 2d day of February, 1878.

BENJAMIN D. MORRELL.

Witnesses:
T. F. LEHMANN,
SAML. DIESCHER.